(12) United States Patent
Bose et al.

(10) Patent No.: US 10,721,594 B2
(45) Date of Patent: Jul. 21, 2020

(54) LOCATION-BASED AUDIO MESSAGING

(71) Applicant: Microsoft Technology Licensing, LLC, Redmond, WA (US)

(72) Inventors: Raja Bose, Mountain View, CA (US); Hiroshi Horii, Redwood City, CA (US); Jonathan Lester, San Francisco, CA (US); Ruchita Bhargava, Redmond, WA (US); Kazuhito Koishida, Redmond, WA (US); Michelle L. Holtmann, Kent, WA (US); Christina Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/316,667

(22) Filed: Jun. 26, 2014

(65) Prior Publication Data

US 2015/0382138 A1    Dec. 31, 2015

(51) Int. Cl.
*H04W 24/00* (2009.01)
*H04W 4/029* (2018.01)
(Continued)

(52) U.S. Cl.
CPC ........ *H04W 4/029* (2018.02); *G06Q 30/0259* (2013.01); *G06Q 30/0261* (2013.01);
(Continued)

(58) Field of Classification Search
CPC ......... H04W 4/12; H04W 4/18; H04W 68/00; H04W 4/14; H04W 4/16; H04W 4/02; H04W 4/021; H04M 1/72547
(Continued)

(56) References Cited

U.S. PATENT DOCUMENTS 5,532,680 A    7/1996 Ousborne
6,728,522 B1   4/2004 Marrah et al.
(Continued)

FOREIGN PATENT DOCUMENTS

CN    101449546 A    6/2009
CN    101197887 b2 *  3/2012 .............. H04M 7/00
(Continued)

OTHER PUBLICATIONS

Caldwell, Serenity, "Geofencing Alerts to Come to Find My Friends this fall", Published on: Jun. 14, 2012, pp. 2, Available at: http://www.macworld.com/article/1167267/geofencing_alerts_to_come_to_find_my_friends_this_fall.html.
(Continued)

*Primary Examiner* — Joseph Arevalo
(74) *Attorney, Agent, or Firm* — Ray Quinney & Nebeker; Thomas M. Hardman; Matthew M. Walker

(57) ABSTRACT

Mobile devices provide a variety of techniques for presenting messages from sources to a user. However, when the message pertains to the presence of the user at a location, the available communications techniques may exhibit deficiencies, e.g., reliance on the memory of the source and/or user of the existence and content of a message between its initiation and the user's visit to the location, or reliance on the communication accessibility of the user, the device, and/or the source during the user's location visit. Presented herein are techniques for enabling a mobile device, at a first time, to receive a request to present an audio message during the presence of the user at a location; and, at a second time, detecting the presence of the user at the location, and presenting the audio message to the user, optionally without awaiting a request from the user to present the message.

15 Claims, 11 Drawing Sheets

(51) Int. Cl.
  *H04L 12/58* (2006.01)
  *G06Q 30/02* (2012.01)
  *H04M 1/725* (2006.01)
  *H04M 3/42* (2006.01)
  *H04L 29/08* (2006.01)
  *H04M 3/487* (2006.01)
  *H04W 4/12* (2009.01)
  *H04W 4/021* (2018.01)

(52) U.S. Cl.
  CPC ..... *G06Q 30/0264* (2013.01); *G06Q 30/0267* (2013.01); *G06Q 30/0272* (2013.01); *H04L 51/043* (2013.01); *H04L 51/10* (2013.01); *H04L 51/20* (2013.01); *H04L 67/18* (2013.01); *H04M 1/7255* (2013.01); *H04M 1/72572* (2013.01); *H04M 3/42357* (2013.01); *H04M 3/487* (2013.01); *H04W 4/12* (2013.01); *H04L 67/04* (2013.01); *H04W 4/021* (2013.01)

(58) Field of Classification Search
  USPC ..... 455/456.3, 457, 456.1, 412.1, 3.01, 413, 455/456.6, 404.1, 404.2, 466, 412, 414.1, 455/522, 436, 68
  See application file for complete search history.

(56) References Cited

U.S. PATENT DOCUMENTS

| | | | |
|---|---|---|---|
| 6,731,925 B2 | 5/2004 | Naboulsi | |
| 6,956,832 B1* | 10/2005 | Muhonen | H04L 12/58 370/310 |
| 7,162,277 B2 | 1/2007 | Yueh | |
| 7,212,944 B1 | 5/2007 | Kohler et al. | |
| 7,336,929 B2 | 2/2008 | Yasuda et al. | |
| 7,627,289 B2 | 12/2009 | Huddart | |
| 7,991,356 B2 | 8/2011 | Batey, Jr. et al. | |
| 8,081,765 B2 | 12/2011 | Yu | |
| 8,099,289 B2 | 1/2012 | Mozer et al. | |
| 8,155,336 B2 | 4/2012 | Tang | |
| 8,208,642 B2 | 6/2012 | Edwards | |
| 8,219,558 B1* | 7/2012 | Trandal | G06Q 10/087 707/736 |
| 8,531,294 B2 | 9/2013 | Slavin et al. | |
| 8,532,627 B1 | 9/2013 | Nassimi | |
| 8,537,003 B2 | 9/2013 | Khachaturov et al. | |
| 8,542,097 B2 | 9/2013 | Ross et al. | |
| 8,896,529 B2 | 11/2014 | Immonen et al. | |
| 9,032,042 B2 | 5/2015 | Cartier et al. | |
| 9,185,062 B1* | 11/2015 | Yang | H04L 51/046 |
| 9,357,052 B2 | 5/2016 | Ullrich | |
| 9,477,313 B2 | 10/2016 | Mistry et al. | |
| 9,806,795 B2 | 10/2017 | Chen | |
| 9,807,495 B2 | 10/2017 | Hodges et al. | |
| 10,051,107 B1 | 8/2018 | Pradad et al. | |
| 2002/0040255 A1 | 4/2002 | Neoh | |
| 2002/0057285 A1 | 5/2002 | Nicholas | |
| 2002/0059425 A1* | 5/2002 | Belfiore | G06F 9/54 709/226 |
| 2002/0123327 A1 | 9/2002 | Vataja | |
| 2003/0182003 A1 | 9/2003 | Takashima | |
| 2003/0187655 A1* | 10/2003 | Dunsmuir | H04M 3/53333 704/270 |
| 2004/0202117 A1 | 10/2004 | Wilson et al. | |
| 2004/0228463 A1 | 11/2004 | Sauvage et al. | |
| 2005/0129250 A1 | 6/2005 | Aubauer et al. | |
| 2005/0144279 A1 | 6/2005 | Wexelblat | |
| 2007/0129888 A1 | 6/2007 | Rosenberg | |
| 2007/0177558 A1 | 8/2007 | Ayachitula et al. | |
| 2007/0255435 A1 | 11/2007 | Cohen et al. | |
| 2007/0282959 A1 | 12/2007 | Stern | |
| 2008/0031475 A1 | 2/2008 | Goldstein | |
| 2008/0119239 A1 | 5/2008 | Mabuschi | |
| 2008/0132293 A1 | 6/2008 | Gundlach et al. | |
| 2008/0151817 A1 | 6/2008 | Fitchett et al. | |
| 2008/0194209 A1 | 8/2008 | Haupt et al. | |
| 2008/0220940 A1 | 9/2008 | Kasama | |
| 2009/0017875 A1 | 1/2009 | Bosen | |
| 2009/0080526 A1 | 3/2009 | Vasireddy | |
| 2009/0138507 A1 | 5/2009 | Burckart et al. | |
| 2009/0154739 A1 | 6/2009 | Zellner | |
| 2009/0164640 A1* | 6/2009 | Schultz | G06Q 10/00 709/227 |
| 2009/0319290 A1 | 12/2009 | Loder et al. | |
| 2009/0327941 A1 | 12/2009 | Fong et al. | |
| 2010/0004005 A1 | 1/2010 | Pereira et al. | |
| 2010/0054518 A1 | 3/2010 | Goldin | |
| 2010/0087182 A1 | 4/2010 | Stewart et al. | |
| 2011/0054647 A1* | 3/2011 | Chipchase | H04M 3/42127 700/94 |
| 2011/0068915 A1* | 3/2011 | Wakefield, III | G01S 5/0009 340/539.13 |
| 2011/0161432 A1* | 6/2011 | Ellanti | G06Q 10/109 709/206 |
| 2011/0213657 A1* | 9/2011 | O'Malley | G06Q 30/0251 705/14.49 |
| 2012/0002822 A1 | 1/2012 | Peissig et al. | |
| 2012/0064921 A1 | 3/2012 | Hernoud et al. | |
| 2012/0213381 A1 | 8/2012 | Pelland et al. | |
| 2012/0214515 A1* | 8/2012 | Davis | H04W 4/023 455/456.3 |
| 2012/0270563 A1 | 10/2012 | Sayed | |
| 2012/0302258 A1 | 11/2012 | Pai et al. | |
| 2012/0331093 A1 | 12/2012 | Cartier et al. | |
| 2013/0021373 A1 | 1/2013 | Vaught et al. | |
| 2013/0022220 A1 | 1/2013 | Dong et al. | |
| 2013/0027429 A1 | 1/2013 | Hogg et al. | |
| 2013/0203442 A1* | 8/2013 | LeBlanc | G06Q 10/109 455/456.3 |
| 2013/0278492 A1 | 10/2013 | Stolarz et al. | |
| 2013/0305164 A1 | 11/2013 | Karunamuni et al. | |
| 2013/0331093 A1 | 12/2013 | Cho et al. | |
| 2014/0148132 A1* | 5/2014 | Pelttari | H04M 1/6505 455/412.1 |
| 2014/0180863 A1* | 6/2014 | Ganesan | G06Q 30/06 705/26.4 |
| 2014/0235282 A1 | 8/2014 | Kansal et al. | |
| 2015/0036835 A1 | 2/2015 | Chen | |
| 2015/0039369 A1 | 2/2015 | Chen | |
| 2015/0346912 A1* | 12/2015 | Yang | H04L 51/046 715/727 |
| 2015/0350130 A1* | 12/2015 | Yang | H04L 51/046 715/752 |
| 2017/0024533 A1 | 1/2017 | Jung et al. | |
| 2017/0220212 A1* | 8/2017 | Yang | H04L 51/046 |
| 2018/0343338 A1 | 11/2018 | Prasad et al. | |

FOREIGN PATENT DOCUMENTS

| | | |
|---|---|---|
| CN | 102439621 A | 5/2012 |
| CN | 103248999 A | 8/2013 |
| EP | 1349420 A2 | 10/2003 |
| EP | 2451187 A2 | 5/2012 |
| JP | 2002156241 A | 5/2002 |
| JP | 2003500984 A | 1/2003 |
| JP | 2004133746 A | 4/2004 |
| JP | 2004159058 A | 6/2004 |
| JP | 2007526694 A | 9/2007 |
| JP | 2010034695 A | 2/2010 |
| JP | 2011033445 A | 2/2011 |
| JP | 5397720 B1 | 1/2014 |
| RU | 2476003 C2 | 2/2013 |
| WO | 0217658 A1 | 2/2002 |
| WO | 2009144529 A1 | 12/2009 |
| WO | 2010117714 A1 | 10/2010 |
| WO | 2011067675 A2 | 6/2011 |

OTHER PUBLICATIONS

International Search Report and Written Opinion in PCT Application No. PCT/US2015/037297, dated Dec. 22, 2015, 24 Pages.

(56) References Cited

OTHER PUBLICATIONS

Second Written Opinion Issued in PCT Application No. PCT/US2015/037297, dated May 18, 2016, 16 Pages.
"International Preliminary Report on Patentability Issued in PCT Application No. PCT/US2015/037297." dated Oct. 11, 2016, 18 Pages.
"Bluetooth Stereo Clip Headset with Built-in FM Radio and OLEO Display", Retrieved From: https://web.archive.org/web/20091002132245/http://shop.brando.com/bluetooth-stereo-clip-headset-with-built-in-fm-radio-and-oled-display_p03789c0201d033.html, Oct. 2, 2009, 2 Pages.
"Miisport Stereo Bluetooth Headset w/Built-in mp3 Player", Retrieved From: https://web.archive.org/web/20130527030556/http://www.greenplanetcollections.com/miisport-stereo-bluetooth-headset-w-built-in-mp3-player-black, May 22, 2013, 3 Pages.
"Plantronics Voyager Legend Bluetooth Headset—Retail Packaging—Black", Retrieved From: https://web.archive.org/web/20170418024823/https://www.amazon.in/Plantronics-Voyager-Legend-Bluetooth-Headset/dp/B009ZNGDTA, May 27, 2013, 7 Pages.
"Scosche Stereo Headphones with Tapline Music Control and Microphone for Apple iPod / iPhone", Retrieved From: https://web.archive.org/web/20101101234559/http://www.amazon.com/Scosche-Headphones-Tapline-Control-Microphone/dp/B003FO0J4K, Nov. 1, 2010, 4 Pages.
"Smart Wireless Headset Pro", Retrieved From: http://store.sony.com/webapp.wcs.stores.servlet/ProductDisplay?datalogId=10551&langId=-1&productId=8198552921666417432, Apr. 21, 2012, 2 Pages.
"Streamer Pro: One Device, Many Features", Retrieved From: https://web.archive.org/web/20130406152705/ttp://www.oticonusa.com/product-showcase/connectivity/connectline/connectivity-options/streamer-pro.aspx, May 28, 2013, 4 Pages.
"Final Office Action Issued in U.S. Appl. No. 13/959,109", dated Aug. 12, 2016, 15 Pages.
"Final Office Action Issued in U.S. Appl. No. 13/959,109", dated Jun. 13, 2018, 19 Pages.
"Non Final Office Action Issued in U.S. Appl. No. 13/959,109", dated Apr. 13, 2017, 19 Pages.
"Non Final Office Action Issued in U.S. Appl. No. 13/959,109", dated Nov. 2, 2017, 20 Pages.
Joffrion, et al., "Head Tracking for Using a GPS-Aided 3D Audio MEMS IMU", Retrieved From: http://www.dtic.mil/dtic/tr/fulltext/u2/a444265.pdf, Feb. 2006, 12 Pages.
Kaiser, et al., "Wearable Navigation System for the Visually Impaired and Blind People", In Proceedings of 11th International Conference on Computer and Information Science, May 30, 2012, 4 Pages.
"International Preliminary Report on Patentability Issued in PCT Application No. PCT/US2014/049323", dated May 22, 2015, 7 Pages.
"International Search Report and Written Opinion Issued in PCT Patent Application No. PCT/US2014/049323", dated Oct. 24, 2014, 10 Pages.
Schiessl, Simon Karl Josef, "Acoustic Chase: Designing an Interactive Audio Environment to Stimulate Human Body Movement", A Thesis Submitted in Partial Fulfillment of the Requirements of the Technical University of Massachusetts for the Degree of Master of Science in Media Arts and Sciences, Jun. 2004, 60 Pages.
Wozniewski, et al., "Large-Scale Mobile Audio Environments for Collaborative Musical Interaction", In International Conference on New Interfaces for Musical Expression, Jun. 4, 2008, 6 Pages.
"Non-Final Office Action Issued in U.S. Appl. No. 13/959,109", dated Oct. 5, 2018, 25 Pages.

"Office Action issued in Mexican Patent Application No. MX/a/2016/016625", dated Jun. 14, 2018, 6 Pages.
Wikipedia, "Directional Sound," https://en.wikipedia.org/wiki/Directional_sound, accessed Apr. 8, 2015, 2 pages.
"iPhone User Guide Contents for iOS 4.2 and 4.3 Software", Retrieved From: http://manuals.info.apple.com/MANUALS/1000/MA1539/en_US/iPhone_iOS4_User_Guide.pdf, Mar. 9, 2011, 274 Pages.
"Your Personal Assistant", Retrieved From: https://www.sonymobile.com/global-en/products/smart-products/xperia-ear/, Retrieved Date: Sep. 23, 2016, 6 Pages.
"Non Final Office Action Issued in U.S. Appl. No. 13/959,155", dated Feb. 24, 2017, 11 Pages.
"Non Final Office Action Issued in U.S. Appl. No. 15/460,721", dated Jul. 28, 2017, 9 Pages.
Kastrenakes, Jacob, "Intel unveils 'Jarvis,' its always-listening Smart Headset", Retrieved From: https://www.theverge.com/2014/1/6/5282416/intel-unveils-jarvis-its-smart-headset, Jan. 6, 2014, 9 Pages.
Kaul, Aditya, "Smart Earphones Could Be the Dark Horse of Wearables", Retrieved From: https://www.tractica.com/wearable-devices/smart-earphones-could-be-the-dark-horse-of-wearables/, Dec. 12, 2014, 4 Pages.
Matsuo, et al., "Research on Personal Assistant Services Using Wearable Equipment", In the International Conference of IEEE on Portable Information Devices, May 25, 2007, 5 Pages.
McGarry, Caitlin, "Hands-on with Vi, the Fitness Coach in your Ear", Retrieved From: https://www.macworld.com/article/3077549/hardware/hands-on-with-vi-the-fitness-coach-in-your-ear.html, Jun. 1, 2016, 3 Pages.
"International Preliminary Report on Patentability Issued in PCT Application No. PCT/US2014/049324", dated Jul. 31, 2015, 7 Pages.
"International Search Report and Written Opinion Received for PCT Patent Application No. PCT/US2014/049324", dated Jan. 30, 2015, 24 Pages.
"International Search Report and Written Opinion Issued in PCT Application No. PCT/US2018/021637", dated Jun. 11, 2018, 13 Pages.
"Hello Hearables: Meet the Wearable Tech you Stick in your Ear", Retrieved From: https://iq.intel.co.uk/hello-hearables-meet-the-wearable-tech-you-stick-in-your-ear/, Jan. 16, 2015, 8 Pages.
"First Office Action Issued in Chinese Patent Application No. 201580034679.9", dated Jan. 3, 2019, 16 Pages.
"Office Action Issued in Russian Patent Application No. 2016150644", dated Jan. 30, 2019, 7 Pages.
"Final Office Action Issued in U.S. Appl. No. 13/959,109", dated May 16, 2019, 19 Pages.
"Office Action Issued in Mexican Patent Application No. MX/a/2016/016625", dated Feb. 12, 2019, 4 Pages.
"Final Office Action Issued in U.S. Appl. No. 16/036,773", dated Apr. 18, 2019, 14 Pages.
"Non Final Office Action Issued in U.S. Appl. No. 16/036,773", dated Aug. 29, 2018, 11 Pages.
"Office Action Issued in Japanese Patent Application No. 2016-573085", dated Apr. 23, 2019, 6 Pages.
"Smart Wireless Headset Pro", Retrieved From: https://web.archive.org/web/20130626224433/http://www-support-downloads.sonymobile.com/mw1/userguide_DE_MW1_1250-7857.1.pdf, Dec. 2011, 21 Pages.
"Second Office Action Issued in Chinese Patent Application No. 201580034679.9", dated Sep. 10, 2019, 10 Pages.
"Notice of Allowance Issued in Japanese Patent Application No. 2016-573085", dated Oct. 15, 2019, 6 Pages.

* cited by examiner

LOCATION-BASED AUDIO MESSAGING

BACKGROUND

Within the field of computing, many scenarios involve a device that is configured to enable communication between an individual and a message source in a variety of ways.

As a first example, a realtime communication scenario allows two or more users of respective devices to provide an audio message that is presented to the other users in realtime. The communication may be concurrent and perhaps overlapping, such as a telephone call or voice chat session, or consecutive and turn-based, such as a "walkie-talkie" or intercom communication session.

As a second example, a message store scenario allows a source to store a message in a mailbox of a user (e.g., a text message store, an email mailbox, or a voicemail mailbox). The device of the user may receive the message and notify the user of the arrival of the message. The user may then, at a second time selected by the user, request to receive the stored messages, and the device may then present the messages to the user. Optionally, the device may also promptly display the message for the user upon receipt, such as simple message service (SMS) messaging or "instant" chat messaging.

As a third example, a location notification scenario may allow an individual to request notification when a user of a device arrives at a location. The user's device may receive and store the request, and may notify the individual upon detecting an arrival of the user at the location.

As a fourth example, a voice reminder scenario allows a user to provide a reminder to be presented to the same user when the user arrives at a particular location. The reminder may comprise, e.g., a text message, an image, or a video. The device may store the reminder; may continuously or periodically monitor the current location of the device for comparison with the location specified in the reminder; and may present the reminder message to the user upon arrival at the location.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the above-described communication scenarios enable various types of communication, a particular scenario may arise in which a source wishes to convey an audio message to a user while the user is present at a location. For example, the source may wish to provide a voice reminder asking the user to buy bread while the user is visiting a market. Each of the above-described scenarios may present deficiencies in conveying this message to the individual. Realtime communication sessions (such as a telephone call) may immediately convey the message to the user, but the user may not remember the message while visiting the location. A message store may store the message for the user, but may not alert the user during the presence of the user at the location. The user may receive the message before visiting the location but may not remember it while present at the location, or may not access the message store and receive the message until after visiting the location. A location notification system may alert the source when the user arrives at the location, but the source may not be available to contact the user at that time, or may not remember at that time the message that the source wished to convey to the individual. A voice reminder scenario may allow the user to store location-based messages for him- or herself, but does not typically allow other individuals to send location-based reminders to the user.

Presented herein is a communication scenario involving location-based reminders provided by a source for presentation to a user of a mobile device. In accordance with the techniques presented herein, a source may provide a request to present audio messages to the user during the presence of the user at a location. The mobile device of the user may receive and store the request. When the mobile device later detects the presence of the user at the location, the mobile device may then present the audio message to the user. In some embodiments, this presentation occurs automatically, e.g., without the user initiating access to a message store, in order to provide a timely delivery of the message to the user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
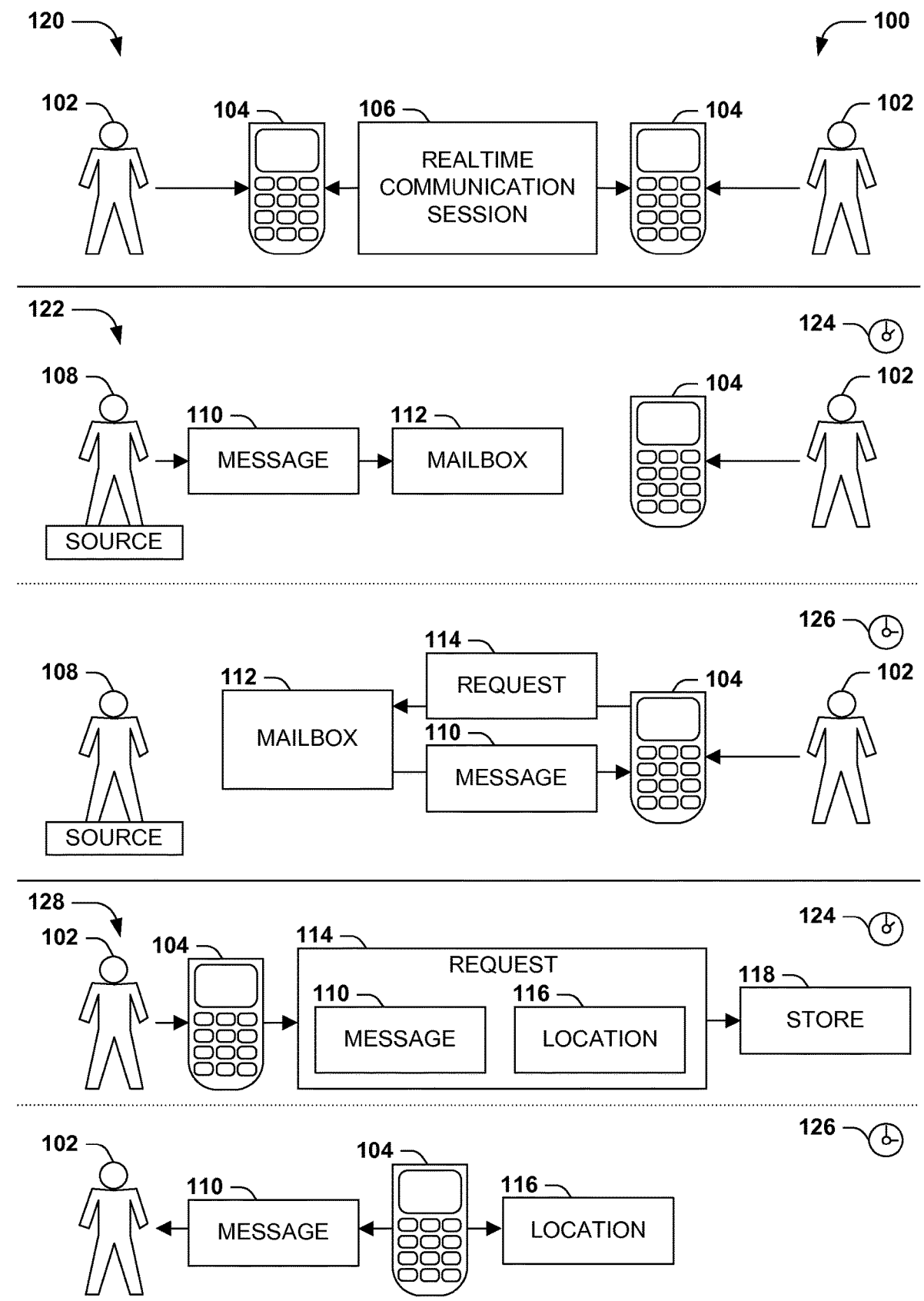
FIG. 1 is an illustration of various scenarios featuring a device presenting messages to a user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an exemplary scenario 100 involving a variety of techniques for providing messages to users 102 of devices 104.

In a first such technique 120, two or more users 102 of respective devices 104 may engage in a realtime communication session 106, where text, audio, images, video, or other forms of media generated by one user 102 are delivered in realtime to other users 102. Such techniques may occur concurrently and potentially overlapping, such as in a telephone call or teleconference, a videoconference, or an "instant" text messaging chat session, or may be sequential and turn-based, such as in a "walkie-talkie" or intercom communication session.

In a second such technique 122, at a first time 124, a source 108 may generate one or more message 110 that are delivered to a mailbox 112 of a user 102 of a device 104. At a second time 126, the user 102 may initiate a request 114 to review the contents of the mailbox 112, and the mobile device 104 may present the messages 110 stored in the mailbox 112. Optionally, at the first time 124, the mobile device 104 may also present a notification of the receipt of the message 112, and/or the entire message 112 or a synopsis thereof.

In a third such technique 128, at a first time 124, a user 102 of a mobile device 104 may initiate a request 114 for the mobile device 104 to store a message 110, to be presented to the same user 102 upon arriving at a particular location 116. The mobile device 104 may store 118 the message 110 in a memory, and may monitor a current location of the mobile device 104 for comparison with the location 116 specified in the request 114. At a second time 126, when the mobile device 104 detects an arrival at the location 116, the mobile device 104 may present the message 110 to the user 102, e.g., as a "geofence"-based reminder.

In a fourth such technique (not shown), an individual may request a notification when a user 102 has arrived at a particular location 116. When such an arrival is detected, the mobile device 104 may notify the individual of the user's presence at the location 116, and the individual may opt to contact the user 102 to convey a message related to the location 116 (e.g., initiating a phone call to ask the user to purchase bread while visiting a market).

These and other techniques may facilitate communication with a user 102 of a mobile device 104. Given the proliferation of options for contacting the user 102, a source 108 may choose among the available options for contacting an individual 102 based on the circumstances of the message 110 (e.g., whether the message 110 is urgent or ordinary; whether the message is short or protracted; whether the message 110 is a one-way notification, or involves a discussion with the user 102; and whether the message is related to a particular time or location 116).

However, in a particular scenario, a source 108 may wish to convey a message 110 to a user 102 that pertains to a location 116, and that is relevant to the presence of the user 102 at the location 116. For example, a source 108 may wish to remind the user 102 to purchase bread while visiting a market. In this scenario, each of the techniques described above and illustrated in the exemplary scenario 100 of FIG. 1 may be inadequate.

In the first such technique 120, a first user 120 may establish a realtime communication session 106 with a second user 102 in order to convey a message 110 related to a location 116 that the second user 102 intends to visit at a later time. However, upon visiting the location 116, the second user 102 may not remember the message 110, either in its entirety or in particular details. Alternatively, if the first user 102 attempts to initiate a realtime communication session 106 with the second user 102 during the second user's presence at the location, the second user 102 may be unable or unwilling to accept the realtime communication session 106, as such sessions typically entail a diversion of the attention of the user 102 from the location 116. Alternatively, the mobile device 104 may not be available for communication during the presence of the user 102 at the location 116.

In the second such technique 122, a source 108 may leave a message 110 for the user 102 pertaining to the location 116. However, the user 102 may receive the message before visiting the location 116, and, again, may not remember the message in whole or in part upon later visiting the location 116. Alternatively, the user 102 may not access the mailbox 112 until after visiting the location 116, and therefore may not notice or receive the message 110 during the visit.

In the third such technique 128, the user 102 may create a location-based reminder according to the message 110. However, such reminders are not typically created by sources 108 for users 102, but are created by a user 102 for presentation to him- or herself. While a user 102 might respond to a message 110 from a source 108 by creating such a location-based reminder, such creation involves an additional user interaction that the user 102 may not perform, and/or may result in errors in translation between the message 110 received from the source 108 and the reminder.

In the fourth such technique (not shown), at a first time, an individual may request an automated notification when the user 102 reaches the location 116. At a second time, upon receiving such a notification, the individual may then contact the user 102 to relay the message 110. However, this technique involves an additional user interaction. Additionally, at the second time, the individual may not be available to receive the notification and to send the message 110 to the user 102; may not remember the nature of the message 110 that the individual wished to convey to the user 102; or may not be able to reach the user 102, e.g., if the mobile device 104 is not available for communication.

For at least these reasons, it may be appreciated that the available communication techniques may not adequately enable a source to convey a message 110 to a user 102, involving the presence of the user 102 at a location 116. It may be further appreciated that some communication techniques may be more readily compatible with this scenario; e.g., a user may fail to notice a text message or image presented by the mobile device 104 to the user 102 while visiting a location 116 (e.g., while the user's vision and/or attention are occupied), but an audio message may be more readily presented to and received by the user 102 while partially occupied by the visit to the location 116.

B. Presented Techniques

Figure 2:
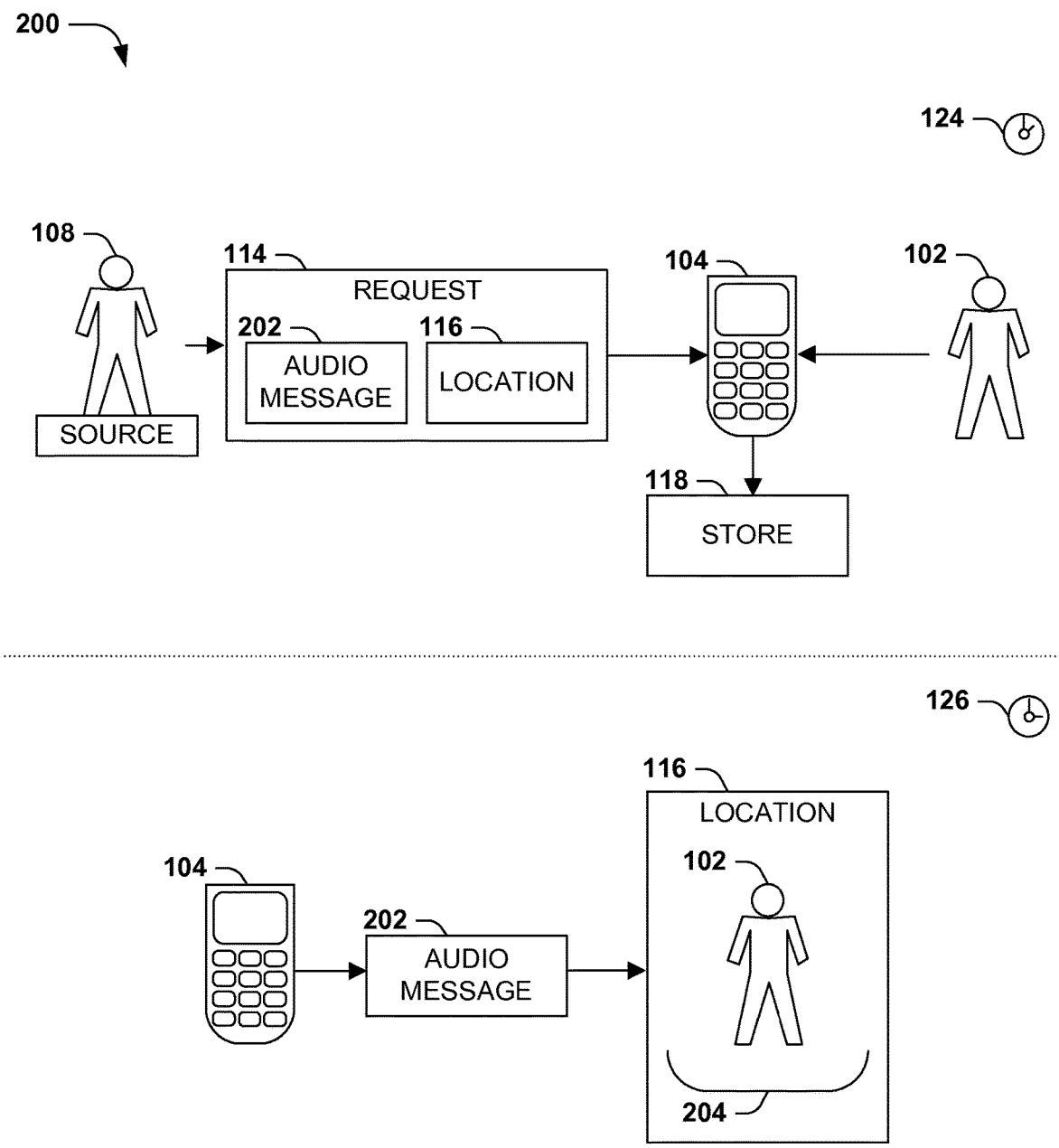
FIG. 2 is an illustration of an exemplary scenario featuring a device presenting an audio message from a source to a user during a presence of the user at a location, in accordance with the techniques presented herein.

FIG. 2 presents an illustration of an exemplary scenario 200 featuring a mobile device 104 that is configured to present an audio message 202 from a source 108 to a user during the presence 204 of the user 102 at a location 116. In this exemplary scenario 200, at a first time 124, the source 108 initiates a request 114 to send an audio message 202 to the user 102 when the user 102 is present at a location 116. At the first time 124, the mobile device 104 of the user 102 may receive and store 118 the request 114. At a second time 126, the mobile device 104 may detect a presence 204 of the user 102 at the location 116, and may present the audio message 202 to the user 102. In some scenarios, the mobile device 104 may present the audio message 204 to the user 102 automatically, e.g., without waiting for a request from the user 102 to play the audio message 202.

The interaction depicted in this exemplary scenario 200 may present many advantages over other communication techniques, including those illustrated in the exemplary scenario 100 of FIG. 1.

As a first example, the source 108 may only be involved in the interaction at the first time 124, and the request 114 may be delivered to the user 102 even if the source 108 is not available at the second time 126 during the presence 204 of the user 102 at the location 116.

As a second example, the delivery of the audio message 202 in the techniques illustrated in FIG. 2 does not rely upon the memory of the user 102 and/or the source 108 as to the existence and contents of the audio message 202. Rather, the audio message 202 is presented in a timely manner during the presence 204 of the user 102 at the location 116.

As a third example, the delivery of the request 114 to the mobile device 104 and the first time 124, and the configuration of the mobile device 104 to store 118 the request 114 at the first time 124, enables the mobile device 104 to complete the delivery of the audio message 202 to the user 102 at the second time 126 even if the mobile device 104 is out of communication range with the source 108. For example, mobile devices often exhibit interruptions in communication service in areas known as "dead zones," and the techniques of FIG. 2 enable the delivery of the audio message 202 even if the location 116 is located in such an area.

As a fourth example, the delivery of the message as an audio message 202 may be particularly suitable for the scenario illustrated in FIG. 2. For example, a user 102 visiting a location 116 may have allocated attention to the visit and may be unable or unwilling to redirect vision to the mobile device 104, and/or may not notice a visual message, such as text, images, or video. However, an audio message 202 may be more appreciably integrated with the attention of the user 102 while occupied with the visit to the location 116, as audio messages 202 do not involve the visual attention of the user 102. Moreover, for some devices 104, an audio message 202 may be played automatically, without the involvement of the user 102 in initiating presentation of the audio message 202. These and other advantages may be achievable by the presentation of audio messages 202 to the user 102 in accordance with the techniques presented herein.

C. Exemplary Embodiments

Figure 3:
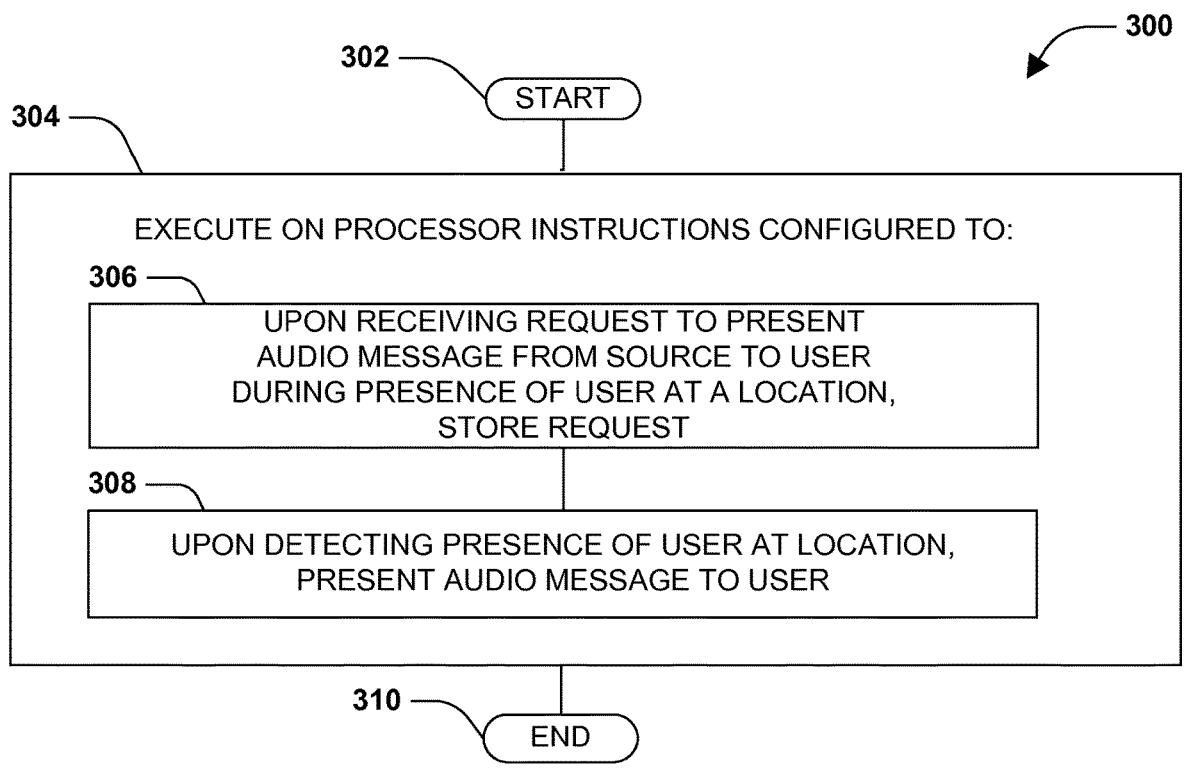
FIG. 3 is an illustration of an exemplary method for configuring a device to present audio messages from a source to a user during a presence of the user at a location, in accordance with the techniques presented herein.

FIG. 3 presents a first exemplary embodiment of the techniques presented herein, illustrated as an exemplary method 300 of presenting an audio message 202 to a user 102. The exemplary method 300 involves a mobile device 104 having a processor that is capable of executing instructions that cause the device to operate according to the techniques presented herein. The exemplary method 300 may be implemented, e.g., as a set of instructions stored in a memory component of a mobile device 104, such as a memory circuit, a platter of a hard disk drive, a solid-state storage device, or a magnetic or optical disc, and organized such that, when executed on a processor of the mobile device 104, cause the mobile device 104 to operate according to the techniques presented herein. The exemplary method 300 begins at 302 and involves executing 304 the instructions on a processor of the mobile device 104. Specifically, the instructions cause the mobile device 104 to, upon receiving a request 114 to present an audio message 202 from a source 108 to the user 102 during a presence of the user 102 at a location 116, store 306 the request 114. The instructions also cause the mobile device 104 to, upon detecting a presence 204 of the user 102 at the location 116, present 308 the audio message 202 to the user 102. Having achieved the presentation of the audio message 202 to the user 102 during the presence 204 of the user 102 at the location 116, the exemplary method 300 achieves the implementation of the techniques presented herein on the mobile device 104, and so ends at 310.

Figure 4:
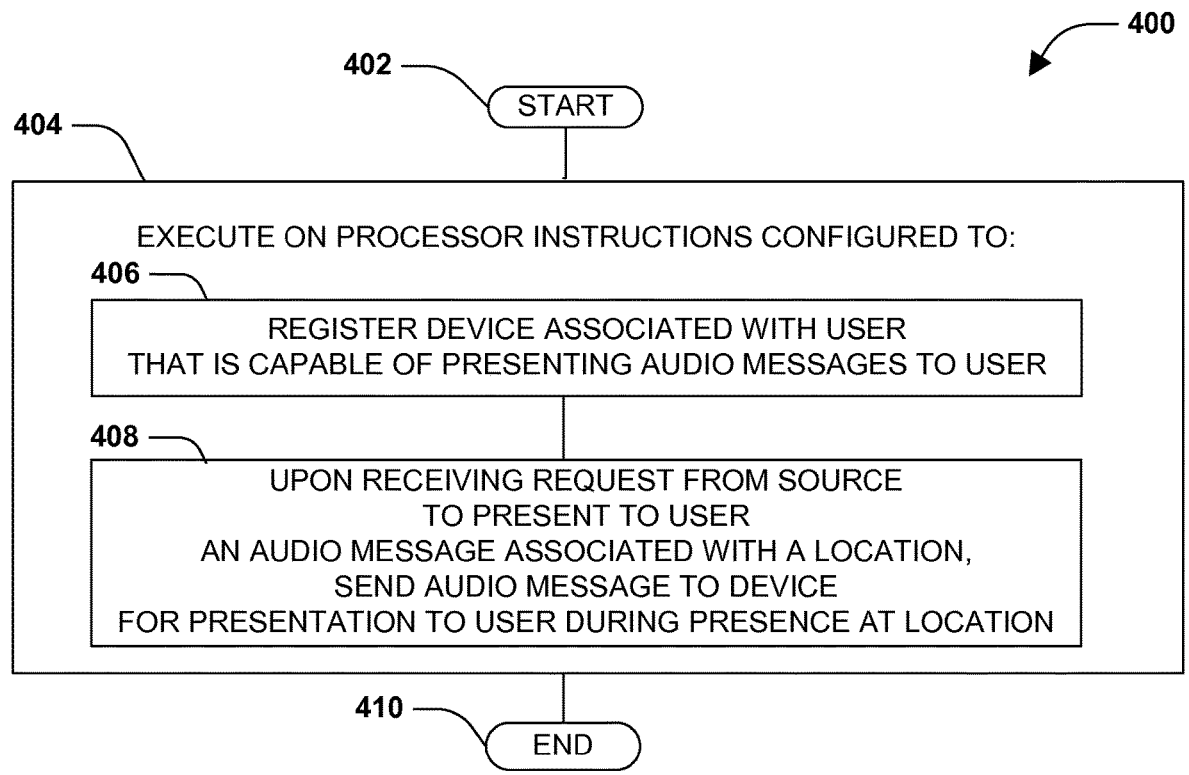
FIG. 4 is an illustration of an exemplary method for configuring a server to facilitate the presentation of audio messages from sources to users during the presence of the user at a location, in accordance with the techniques presented herein.

FIG. 4 presents a second exemplary embodiment of the techniques presented herein, illustrated as an exemplary method 400 of configuring a server to deliver audio messages 202 to users 102. The exemplary method 400 involves a server having a processor that is capable of executing instructions that cause the device to operate according to the techniques presented herein. The exemplary method 400 may be implemented, e.g., as a set of instructions stored in a memory component of a server, such as a memory circuit, a platter of a hard disk drive, a solid-state storage device, or a magnetic or optical disc, and organized such that, when executed on a processor of the server, cause the server to operate according to the techniques presented herein. The exemplary method 400 begins at 402 and involves executing 404 the instructions on a processor of the server. Specifically, the instructions cause the server 406 to register 406 a device 104 associated with the user 102 that is capable of presenting audio messages 202 to the user 102. The instructions also cause the server 406 to, upon receiving a request 114 from a source 108 to present to the user 102 an audio message 202 associated with a location 116, send 408 the audio message 202 to the mobile device 104 for presentation during a presence 204 of the user 102 at the location 116. Having achieved the delivery of the audio message 202 to the mobile device 104 of the user 102, for presentation to the user 102 during the presence 204 of the user 102 at the location 116, the exemplary method 400 achieves the implementation of the techniques presented herein on the server, and so ends at 410.

Figure 5:
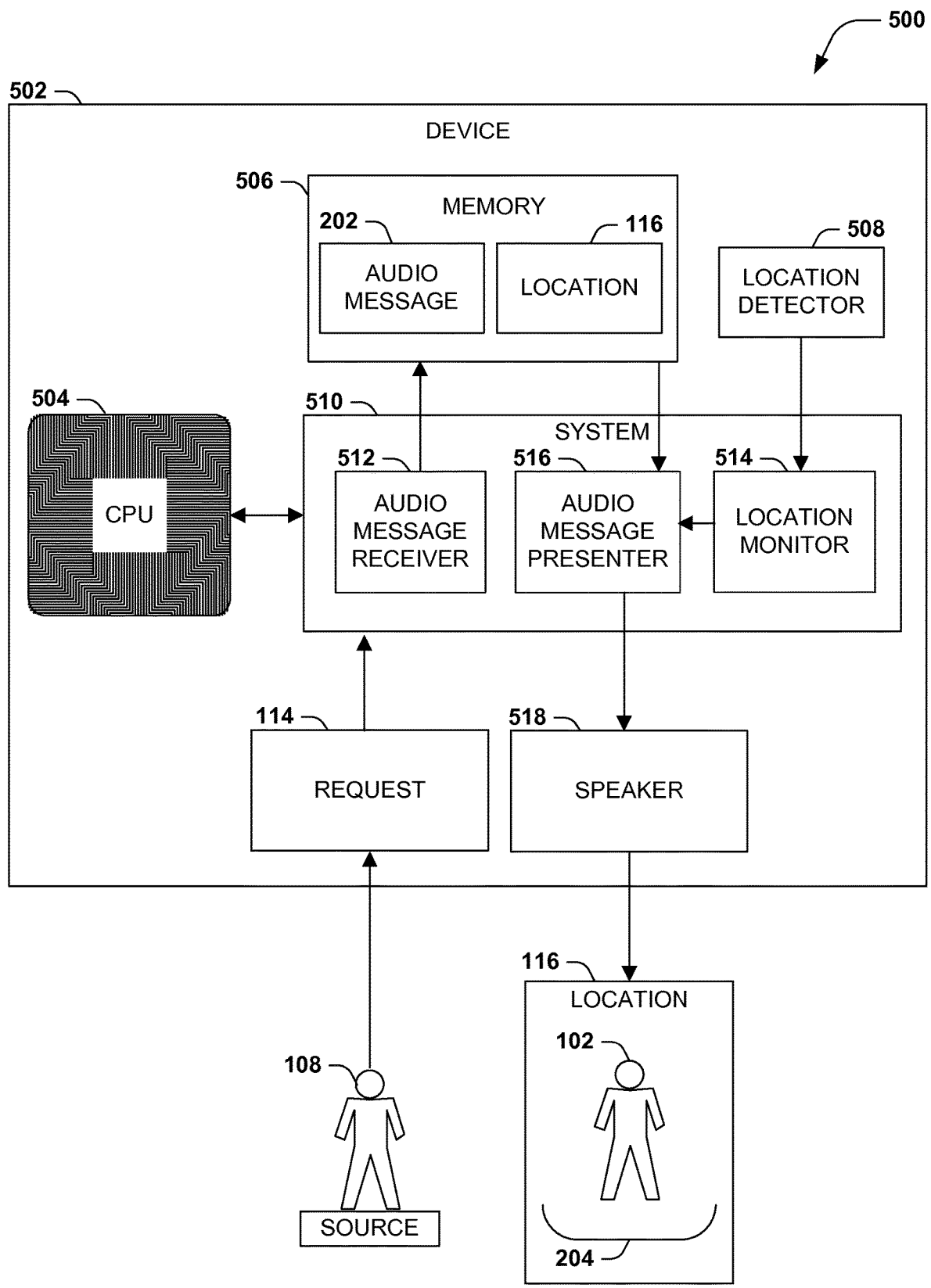
FIG. 5 is an illustration of an exemplary device including a system for presenting audio messages from a source to a user during a presence of the user at a location, in accordance with the techniques presented herein.

FIG. 5 presents a third exemplary embodiment of the techniques presented herein, illustrated as an exemplary scenario 500 featuring an exemplary system 510 configured to cause a mobile device 502 to present audio messages 202 to a user 102. The exemplary system 510 may be implemented, e.g., as a set of components respectively comprising a set of instructions stored in a memory 506 of the device 502, where the instructions of the respective components, when executed on a processor 504 of the device 502, cause the device 502 to perform a portion of the techniques presented herein. The exemplary system 510 includes an audio message receiver 512, which, upon receiving a request 114 to present an audio message 202 from a source 108 to the user 102 during a presence 204 of the user 102 at a location 116, stores the request 114 in the memory 506. The exemplary system 510 also includes a location monitor 514, which compares a current location of the device 502 (e.g., coordinates generated by a location detector 508, such as a global positioning system (GPS) receiver, or a triangulator) with the location 116 of the request 114. The exemplary system 510 also includes an audio message presenter 516, which, upon the location monitor 516 detecting a presence 204 of the user 102 at the location 116, presents the audio message 202 to the user 102. In this manner, the exemplary system 408 causes the device 402 to perform actions 108 involving an individual 108 while the user 102 is in the presence of the individual 202 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that exclude computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
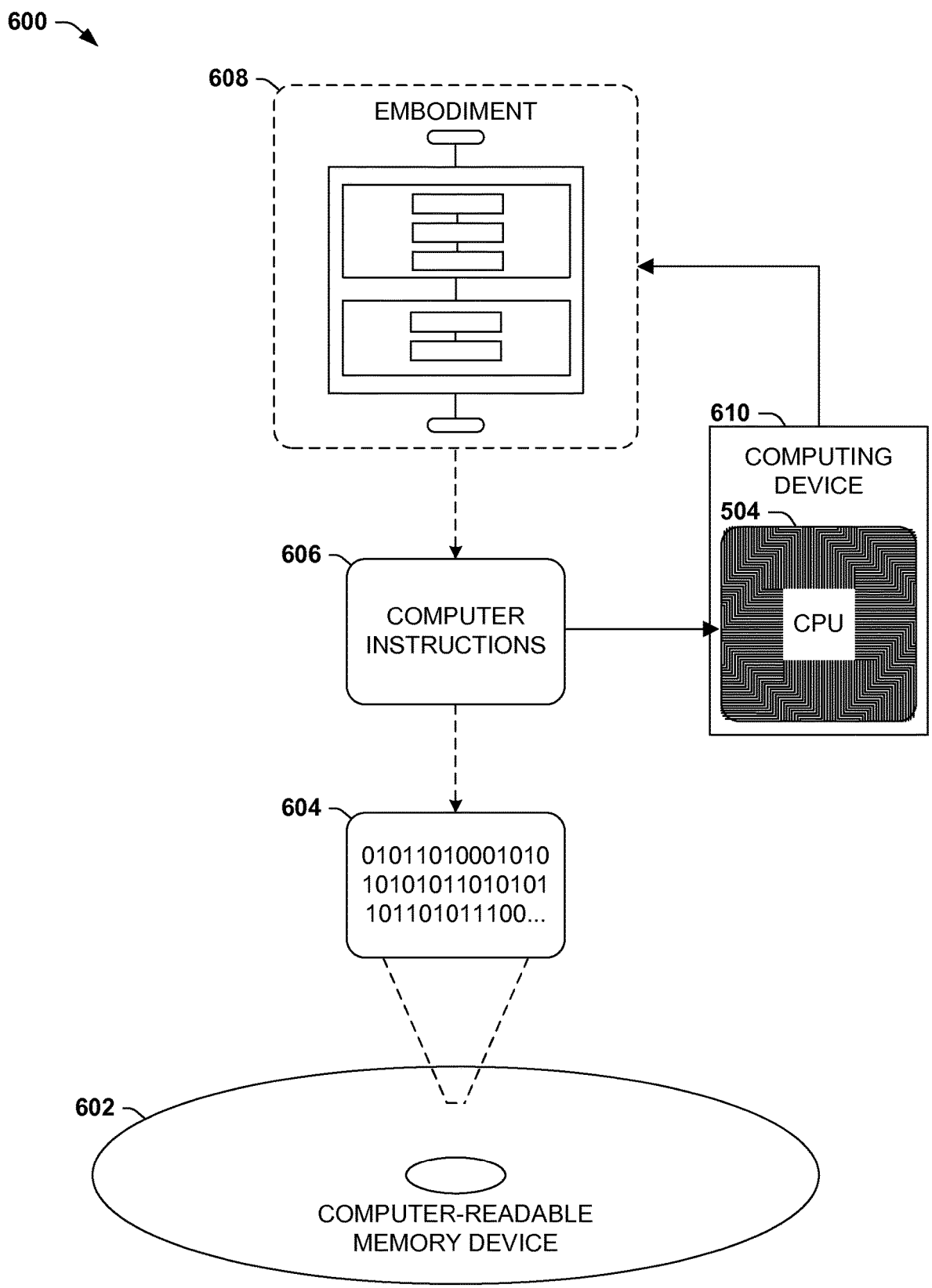
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 504. This computer-readable data 604 in turn comprises a set of computer instructions 606 that, when executed on a processor 504 of a computing device 610, cause the computing device 610 to operate according to the principles set forth herein. In a first such embodiment, the processor-executable instructions 606 may be configured to perform a method of configuring a computing device 610 to present an audio message 202 to a user 102, such as the exemplary method 300 of FIG. 3. In a second such embodiment, the processor-executable instructions 606 may be configured to perform a method of configuring a computing device 610 to deliver an audio message 202 to mobile device 104 of a user 102, such as the exemplary method 400 of FIG. 4. In a third such embodiment, the processor-executable instructions 606 may be configured to implement a system configured to cause a computing device 610 to present audio messages 202 to a user 102, such as the exemplary system 510 of FIG. 5. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3; the exemplary method 400 of FIG. 4; the exemplary system 510 of FIG. 5; and the exemplary computer-readable memory device 602 of FIG. 6) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized to achieve the configuration of a variety of mobile devices 104, such as laptops, tablets, phones and other communication devices, headsets, earpieces, eyewear, wristwatches, portable gaming devices, portable media players such as televisions, and mobile appliances. The techniques presented herein may also be utilized to achieve the configuration of a wide variety of servers to deliver audio messages 202 to mobile devices 104, such as communication intermediary services that transfer messages from sources 108 to users 102; storage services that store messages 110 to be delivered to users 102; and cellular communication servers that provide mobile communication capabilities for mobile devices 104.

Figure 7:
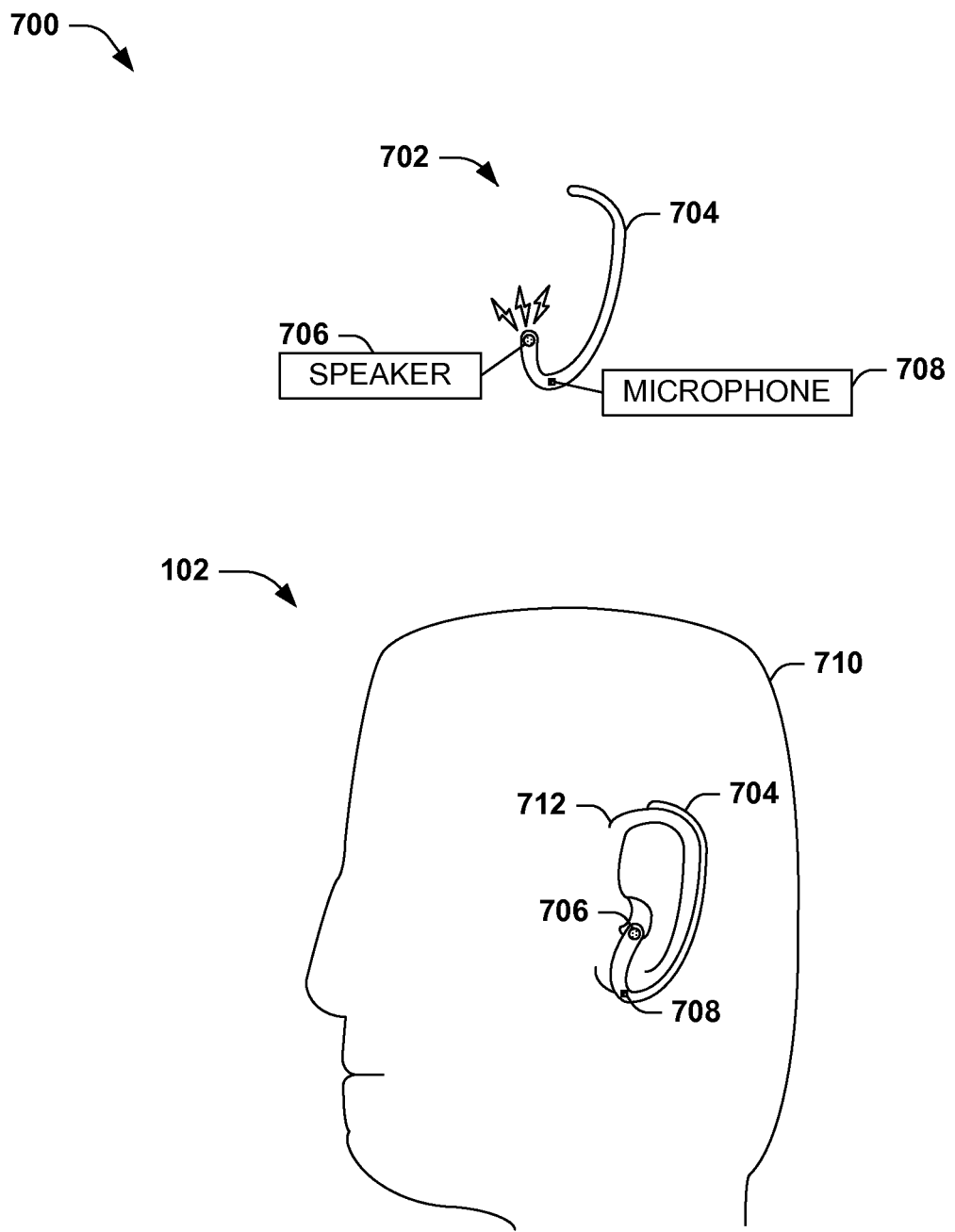
FIG. 7 is an illustration of an exemplary device in which the techniques provided herein may be utilized.

FIG. 7 presents an illustration of an exemplary scenario 700 featuring an earpiece device 702 wherein the techniques provided herein may be implemented. This earpiece device 702 may be worn by a user 102, and may include components that are usable to implement the techniques presented herein. For example, the earpiece device 702 may comprise a housing 704 wearable on the ear 712 of the head 710 of the user 102, and may include a speaker 706 positioned to project audio messages into the ear 712 of the user 102, and a microphone 708 that detects an audio sample of the environment of the user 102. In accordance with the techniques presented herein, the earpiece device 702 may receive and store a request 114 to present an audio message 202 to the user 102 during a presence 204 at the location 116, and may, upon detecting the presence 204 of the user 102 at the location 116, present the audio message 202 to the user 102. In some such earpiece devices 702, the audio message 202 may be presented to the user 102 without awaiting a request from the user 102 to present the audio message 202. In this manner, an earpiece device 702 such as illustrated in the exemplary scenario 700 of FIG. 7 may utilize the techniques presented herein.

As a second variation of this first aspect, the techniques presented herein may be implemented on a combination of such devices, such as a server that receives the audio message 202 from the source 108 and forwards it to the mobile device 104 (e.g., as provided in the exemplary method 400 of FIG. 4), and a mobile device 104 that receives the audio message 202 and presents it to the user 102 during the presence 204 of the user 102 at the location 116 (e.g., as provided in the exemplary method 300 of FIG. 3).

As a third variation of this first aspect, a mobile device 104 may utilize various types of location detectors 508 to detect the presence 204 of the user 102 at the location 116, such as a global positioning system (GPS) receiver by triangulating communication with orbiting satellites; a location triangulator that determines the location of the device 502 by triangulating communication with a nearby set of transmitters at fixed locations; and a wireless receiver that receives a notification that the device 104 is in the proximity of a location 116. Additionally, a mobile device 104 may utilize many types of speakers 518 to present an audio message 202 to the user 102, such as a unidirectional speaker that broadcasts the audio message 202; a directional speaker that limits the transmission of the audio message 202 toward the ear 712 of the user 102; and an implanted speaker that transmits the audio message 202 directly to the ear 712 of the user 102.

As a fourth variation of this first aspect, the mobile devices 104 may transmit many types of audio messages 202 to the user 102. Such audio messages 202 may include, e.g., a speech segment recorded or pre-recorded by the source 108; a standardized speech segment or audial cue corresponding with a message 110 sent by the source 108; synthesized speech generated by the mobile device 104 or a server by translating a text message provided by the source 108 into a speech message; and a speech translation from a first language expressed by the source 108 to a second language understood by the user 102. Many such variations may be devised that are compatible with the techniques presented herein.

D2. Receiving Audio Message Request

A second aspect that may vary among embodiments of the techniques presented herein involves the manner of receiving a request 114 from a user 102 to present an audio message 202 to the user 102 during a presence 204 of the user 102 at a location 116.

As a first variation of this second aspect, the request 114 may include one or more conditions on which the presentation of the audio message 202 is conditioned, in addition to the presence 204 of the user 102 at the location 204. For example, the source 108 may request the presentation of the audio message 202 to the user 102 not only during the presence 204 of the user 102 at a particular location 204, but while the time of the presence 204 is within a particular time range (e.g., "if Joe visits the market while the market is open, tell Joe to buy bread at the market"). The mobile device 104 may further store the condition with the audio message 202 associated with the location 116, and may, upon detecting the presence 204 of the individual 202 at the location 116 as well as the condition fulfillment of the condition, present the audio message 202 to the user 102.

As a second variation of this second aspect, the request 114 may comprise a command directed by the source 108 directly to a device 104, such as a text entry, a gesture, a voice command, or pointing input provided through a pointer-based user interface. Alternatively, the request 114 may also be provided as natural language input, such as a natural-language speech request directed to a device and received by the mobile device 104 (e.g., "I should remind Joe to buy bread when he visits the market").

As a third variation of this second aspect, rather than receiving a request 114 directed by the source 108 to a device, a device may infer the request 114 during a communication between the source 108 and another individual, including the user 102. For example, the mobile device 104 of the user 102 may evaluate a communication session between the user 102 and the source 108 at a first time 124, and may detect a communication that specifies the audio message 202 and the location 116, but that does not comprise a command issued by the user source 108 to the mobile device 104. In one such scenario, the mobile device 104 may apply a speech recognition technique to recognize the content of the spoken communication from the source 108, and may infer, from the recognized speech, one or more requests 114 (e.g., "Joe, don't forget to buy bread when you visit the market"). Upon detecting the request 114 in the communication at the first time 124, the mobile device 104 of the user 102 may store the request 114 for presentation at the second time 126 during the presence 204 of the user 102 at the location 116.

As a fourth variation of this second aspect, a request 114 may specify the location 116 as a location type, rather than as a specific location (e.g., rather than specifying "buy bread at the market at 100 Main Street," simply specifying "buy bread at a market"). Additionally, in addition to detecting a current location 116 of the user 102, a mobile device 104 may determine the location type of the current location (e.g., the user 102 is present at a location 116 identified as a market), and may match the location type of the 116 with the location type specified in the request 114.

As a fifth variation of this second aspect, a request 114 may specify a condition to be fulfilled as well as the presence 204 of the user 102 at a location 116. The condition may comprise, e.g., a past condition, such as "tell Joe to buy bread at the market if he didn't buy bread earlier"; a current condition associated with the location 116, such as "tell Joe to buy bread at the market if they have white bread"; or a current condition not associated with the location 116, such as "tell Joe to buy bread at the market if he is not in a hurry." The condition may also comprise, e.g., a time range of the presence 204 of the user 102 at the location 116, such as "tell Joe to buy bread at the market if he visits between nine o'clock and noon," and the mobile device 104 may determine the condition fulfillment by comparing the time of the presence 204 of the user 102 at the location 116 with the time range specified in the request 114. The time range and/or location 116 may also be specified, e.g., as an event, such as "tell Joe to buy bread when or where he has lunch," and the mobile device 104 may compare the current time of the presence 204 of the user 102 at the location 116 with the time range and/or location of the event specified in the request 114.

As a sixth variation of this second aspect, a request 114 to send an audio message 202 may specify at least two users 102 respectively having a mobile device 104. The request 114 may be delivered to the mobile device 104 of each user 102, and may be presented during a presence 204 of each user 102 at the location 116.

Figure 8:
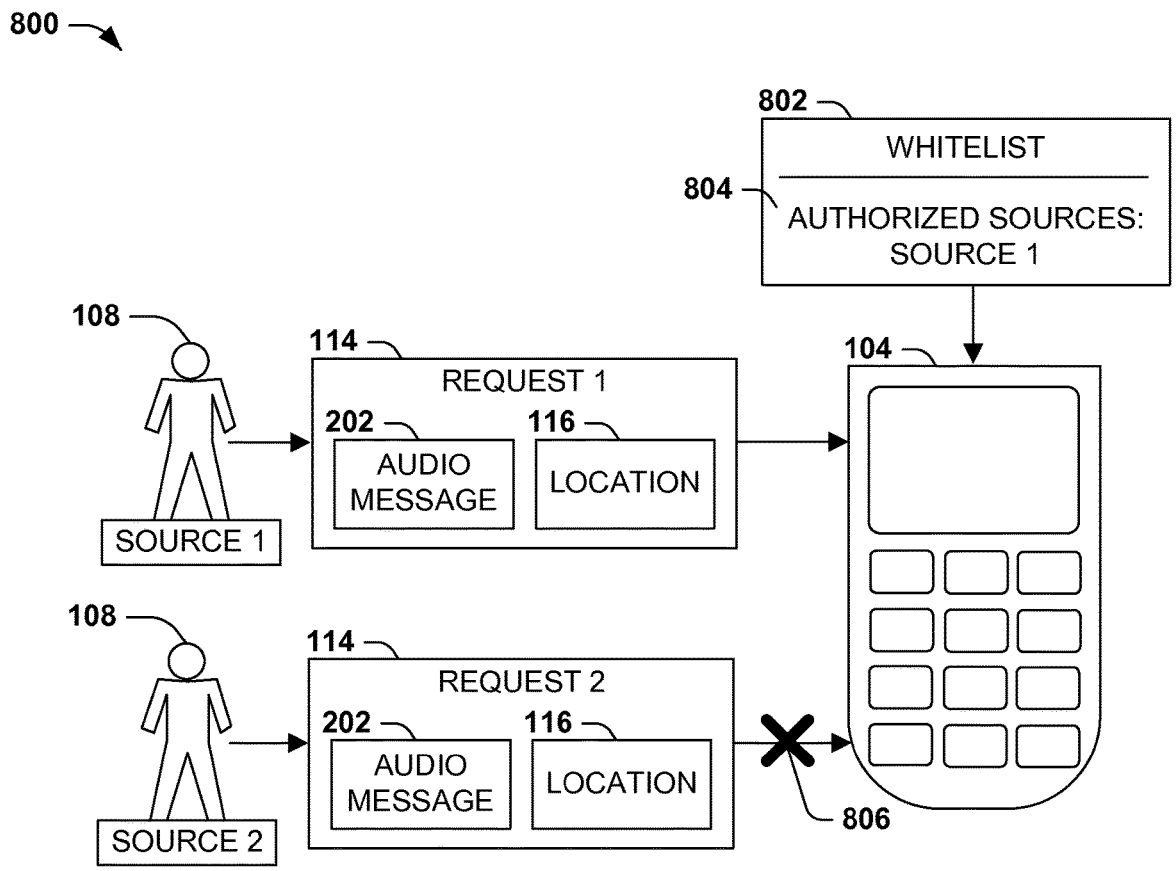
FIG. 8 is an illustration of an exemplary scenario featuring a whitelisting of sources on a device configured according to the techniques presented herein.

FIG. 8 presents an illustration of an exemplary scenario 800 involving a seventh variation of this second aspect, wherein the mobile device 104 features a whitelist 802 that specifies at least one authorized source 804 that is authorized to send requests 114 to the user 102. In this exemplary scenario 800, a first source 108 and a second source 108 each initiate a request 114 to present an audio message 202 to the user 102 during the presence 204 of the user 102 at a location 116. However, the first source 108 may be identified in the whitelist 802 as an authorized source 804, while the second source 108 is not identified in the whitelist 802 as an authorized source 804. Accordingly, the device 104 may receive and store the request 114 from the first source 108, but may reject 806 the request 114 from the second source 108 in accordance with the whitelist 802. These and other variations in the receipt of a request 114 to present an audio message 202 to the user 104 may be utilized in accordance with the techniques presented herein.

D3. Presenting Audio Messages

A third aspect that may vary among embodiments of the techniques presented herein involves the manner of presenting the audio message 202 to the user 102 during the presence 212 of the user 102 at the location 116.

As a first variation of this third aspect, the mobile device 104 may present the audio message 202 to the user 102 promptly upon detecting the presence 204 of the user 102 at the location 116. In one such variation, the mobile device 104 may present the audio message 202 without awaiting a request from the user 102 to present the audio message 202. This variation may be suitable, e.g., for the earpiece device 602 provided in the exemplary scenario 600 of FIG. 6. Alternatively, the mobile device 104 may notify the user 102 that an audio message 202 is available that involves the current location 116 of the user 102, and, upon receiving a request from the user 102 to present the audio message 202, may present the audio message 202 to the user 102.

Figure 9:
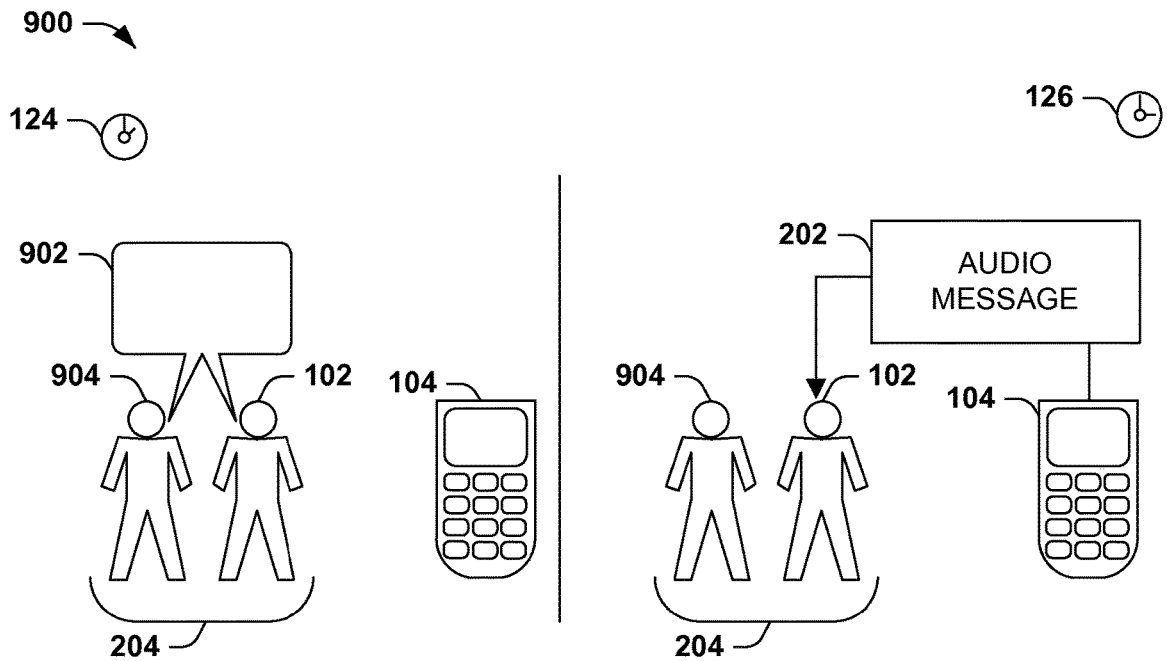
FIG. 9 is an illustration of an exemplary scenario featuring a timed presentation of an audio message to a user of a device configured according to the techniques presented herein.

FIG. 9 presents an illustration of an exemplary scenario 900 featuring a second variation of this third aspect, wherein the mobile device 104 times the delivery of the audio message 202 according to the environment of the user 102. In this exemplary scenario 900, at a first time 124, the mobile device 104 may determine that an audio message 202 is available for presentation during the presence 204 of the user 102 at a current location 116. However, the mobile device 104 may also detect that the user 102 is involved in an interaction 902 with another individual at the location 116 (e.g., by detecting that another individual is speaking with or to the user 102). While the user 102 is interacting, the mobile device 104 may refrain from presenting the audio message 202 in order to avoid interrupting the interaction 902 and/or having the user 102 miss or misunderstand the audio message 202. At a second time 126, also during the presence 204 of the individual 102 at the location 116 and while the user 102 is not interacting with another individual, the mobile device 104 may present the audio message 202 to the user 102 in accordance with this first variation of this third aspect of the techniques presented herein.

As a second variation of this third aspect, the source 108 may request that the mobile device 104 notify the source 108 upon presenting the audio message 202 to the user 102. The mobile device 104 may fulfill this request by, upon presenting the audio message 202 to the user 102, notifying the source 108 that the audio message 202 has been presented to the user 102. This notification may occur automatically; upon receiving consent of the user 102 to notify the source 108; or according to a user preference of the user 102 as to whether or not the mobile device 104 is to provide such notification.

Figure 10:
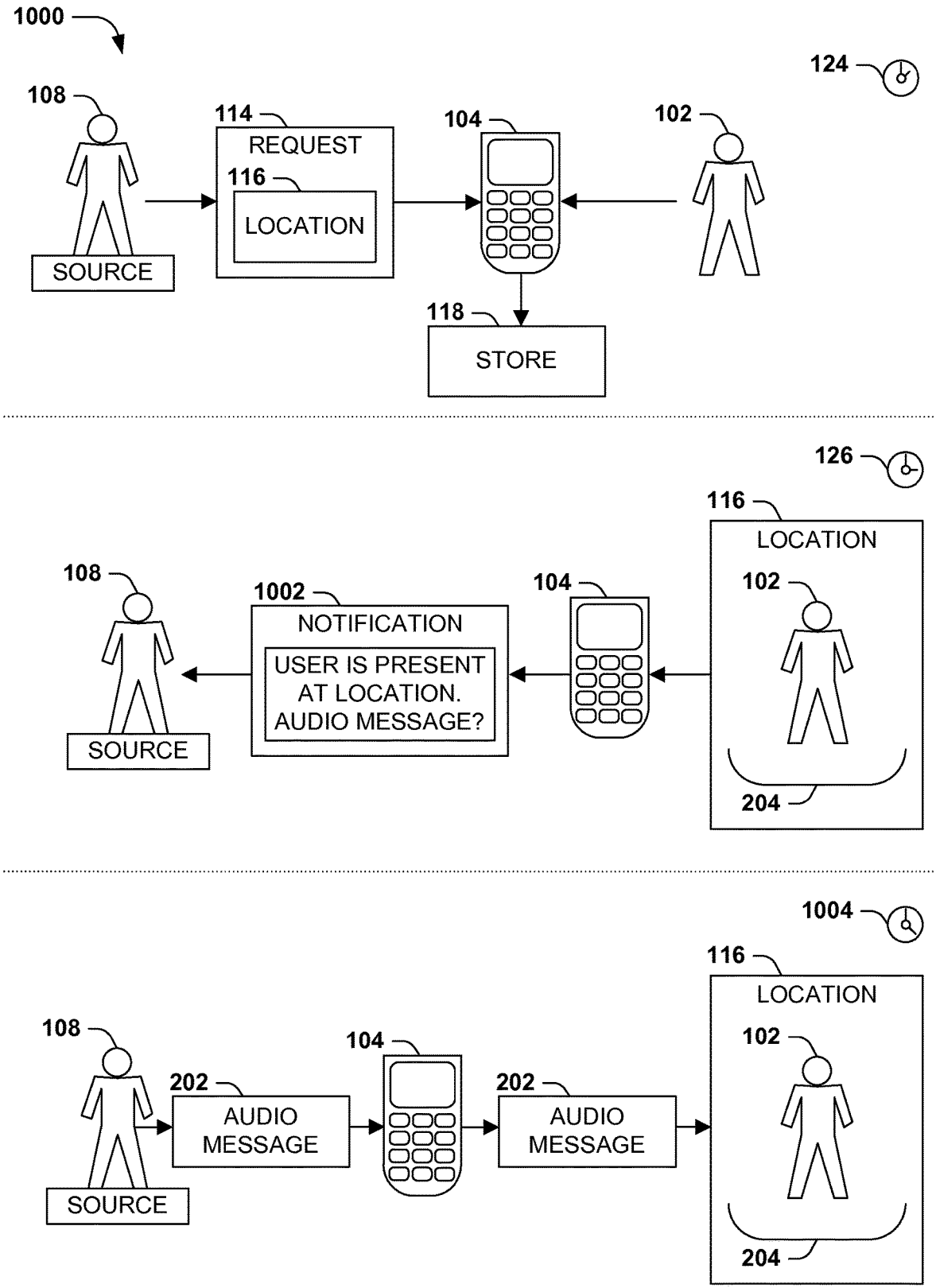
FIG. 10 is an illustration of an exemplary scenario featuring a delayed receipt of an audio message to be presented to a user during a presence at a location, in accordance with the techniques presented herein.

FIG. 10 presents an illustration of an exemplary scenario 1000 featuring a third variation of this third aspect, wherein the request 114 is received from the source 108 at a first time 124, but where the audio message 202 is provided by the source 108 during the presence 204 of the user 102 at the location 116 (e.g., "when Joe gets to the market, I need to tell him what to buy"). In this exemplary scenario 1000, at a first time 124, the source 108 may initiate a request 114 to present an audio message 202 to the user 102 during the presence 204 of the user 102 at a location 116, and the mobile device 104 may store 118 the request 114. At a second time 126, the mobile device 104 may detect the presence 204 of the user 102 at the location 116, and may send a notification 1002 to the source 108, along with a request for the audio message 202. At a third time 1004, upon receiving the audio message 202 from the source 108 in response to the notification 1002 and still during the presence 204 of the user 102 at the location 116, the mobile device 104 may present the audio message 202 to the user 102. This variation therefore allows a delayed provision of the audio message 202 by the source 108 to be presented to the user 102 during the presence 204 of the user 102 at the location 116.

As a fourth variation of this third aspect, a mobile device 104 may accept a response from the user 102 to the audio message 202, and may send the response to the source 108 of the audio message 202. The response may be requested by the source 108 in response to the audio message 202, and/or may be initiated by the user 102 upon receiving the audio message 202. The response may be received, e.g., by a response transmitter of an exemplary system 510 that receives a command from the user 102 following the presentation of the audio message 202, such as a button touch or a verbal command. Alternatively, the response may be received simply by detecting speech of the user 102 that closely follows the audio message 202 and that is expressed in a particular tone, volume, and/or direction (e.g., detecting that the user 102 is speaking downward). As another alternative, after the audio message 202 is presented to the user 102, the mobile device 104 may present to the user an offer to accept a response to the audio message, such as a prompt, and may, upon detecting the acceptance of the offer, record the response for transmission to the sender 108. Additionally, in prompted scenarios, the mobile device 104 may present an offer including at least one response option (e.g., the response options of "yes" and "no" to an audio message 202 presenting a question from the source 108 to the user 102), and may, upon receiving from the user 102 a selection of a selected response option, send to the source 108 a response according to the selected response option. The response may also be sent to the source 108 as a voice message 202, or may be sent using another media modality, such as a text message, an image, a video, or a delivery of data to the source 108.

Figure 11:
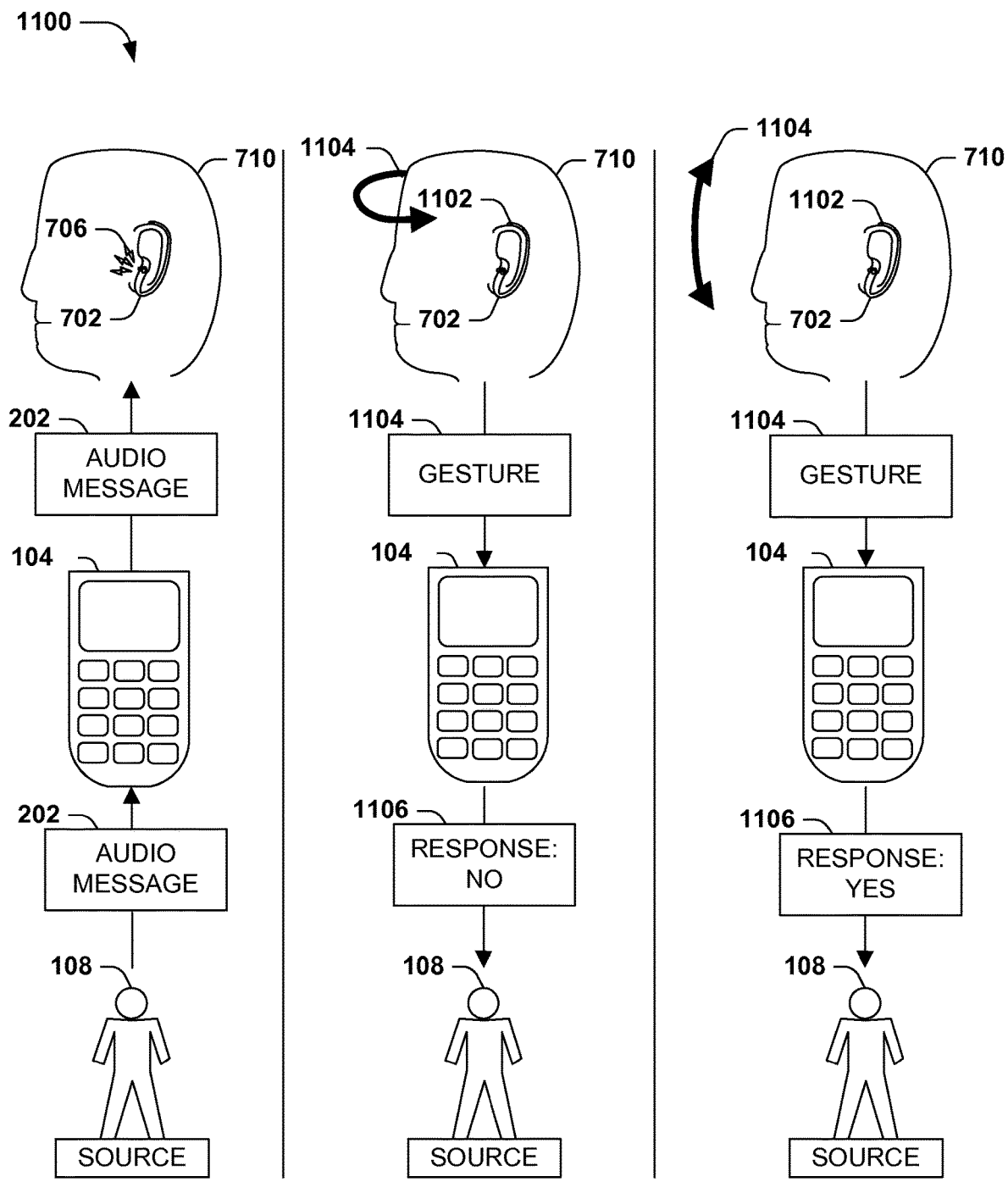
FIG. 11 is an illustration of an exemplary scenario featuring a set of gestures performable by a user to respond to an audio message, in accordance with the techniques presented herein.

FIG. 11 presents an illustration of an exemplary scenario 1100 featuring a fifth variation of this third aspect, wherein an earpiece device 702 presents to the user 102 a set of response options that are respectively associated with a gesture 1104 that is performable by the user 102 to specify a response 1106 to the source 108. In this exemplary scenario 1100, the user 102 wears the earpiece device 702 on an ear, where the earpiece device 702 comprises a speaker 706 positioned to direct sound into the ear of the user 102. The earpiece device 702 receives an audio message 202 from a mobile device 104, and the speaker 706 presents the audio message 202 to the user 102, and a prompt for a set of gestures 1104 that are responsive to the audio message 202 (e.g., "shake head for 'no,' or nod for 'yes'"). If the user 102 opts to perform a gesture 1104 involving shaking or nodding the head, a gesture detector 1102 of the earpiece device 702, such as a gyroscope or accelerometer, detects the gesture 1104, and informs the response transmitter of the selected response option that is associated with the gesture 1104 performed by the user 102 (e.g., informing the response gesture that the user 102 performed a gesture 1104 indicating "yes" or "no"). The response transmitter may then send the response 1106 to the source 108. In this manner, the earpiece device 702 enables the user 102 to provide a response 1106 to the audio message 202 through the use of gestures 1104. Many such techniques may be applied to the presentation of audio messages 202 to the user 102 in accordance with the techniques presented herein.

D4. Server-Mediated Messaging

A fourth aspect that may vary among embodiments of the techniques presented herein involves the provision of a server that coordinates the delivery of audio messages 202 from sources 108 to users 102 of respective mobile devices 104.

As a first variation of this fourth aspect, a server may enable users 102 to subscribe to a source 108 for the delivery of audio messages 202. A server may receive from a user 102 a request to disclose a set of subscribable sources 108, and the server 1202 may present a list of sources 108 to which the user 102 may subscribe. As a further variation, the server 1202 may only present sources 108 to which the user may subscribe 102 that provide audio messages 202 related to locations 116 near a current location of the user 102. For example, the source 108 may comprise a tour guide who provides audio messages 202 relating to a variety of locations 116 in an area, such as a park or historic site, and the users 102 may comprise visitors who wish to listen to audio messages 202 from the tour guide upon visiting the respective locations 116. The server may assist users 102 with the discovery of, subscription to, unsubscription from such sources 108, and may coordinate the delivery of requests 114 to present audio messages 202 during a presence 204 of each subscribed user at a respective location 116.

As a first variation of this fourth aspect, upon receiving a request 114 from a source 108 to present an audio message 202 to a mobile device 104 of a user 102 during a presence 204 of the user 102 at a location 116, a server may promptly forward the request 114 to the device 104. Alternatively, the server may provide a more involved role, e.g., by storing the request 114 upon receipt; monitoring a current location 116 of the mobile device 104 of the user 102; and, upon detecting that the current location 116 of the mobile device 104 matches the location 116 of the request 114, sending the audio message 202 to the mobile device 104 for presentation to the user 102. This alternative variation may be advantageous, e.g., if the user 102 possesses a multitude of mobile devices 104, and if it is not clear which mobile device 104 the user 102 may be using during the presence 204 at the location 116. In a further variation, the server may also relay to the source 108 a response 1106 from the user 102 in response to the audio message 202.

Figure 12:
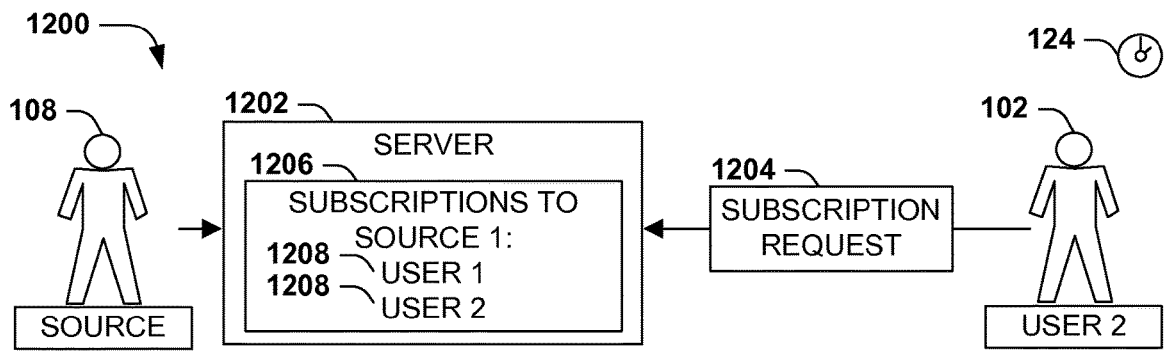
FIG. 12 is an illustration of an exemplary scenario featuring a server enabling subscription of users to a source of audio messages to be presented to subscribers during a presence at a location, in accordance with the techniques presented herein.
Figure 12:
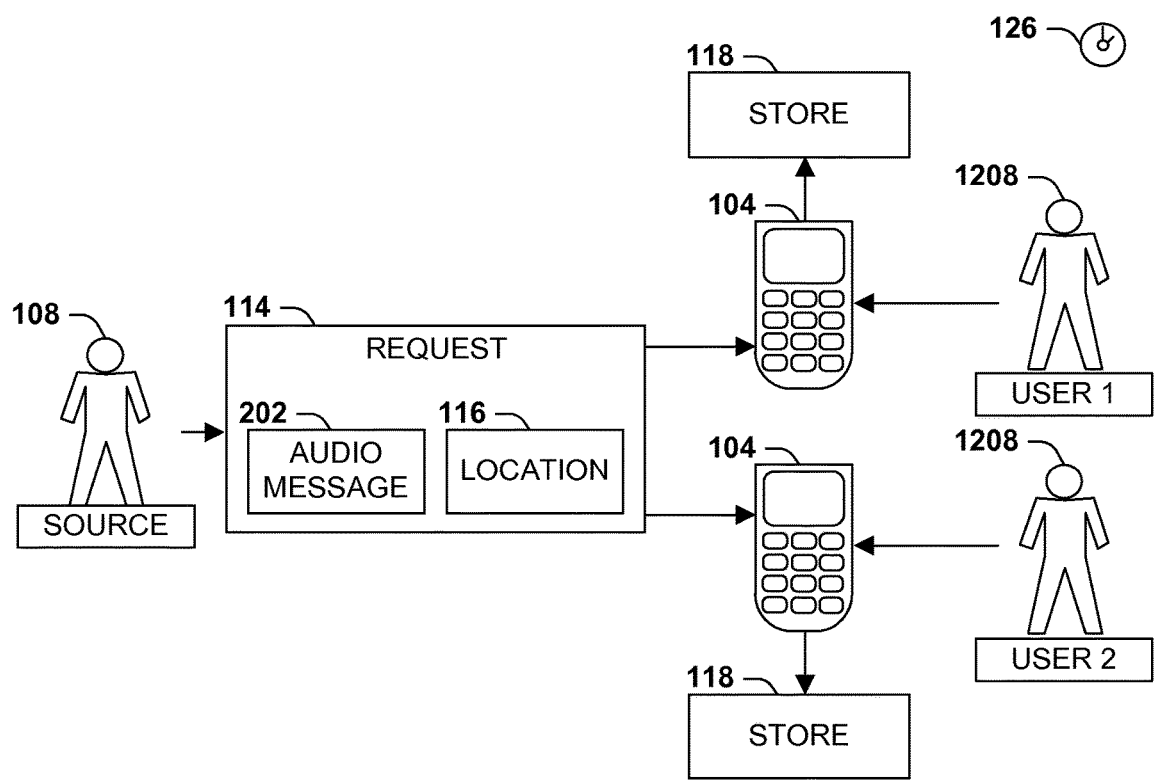
Figure 12:
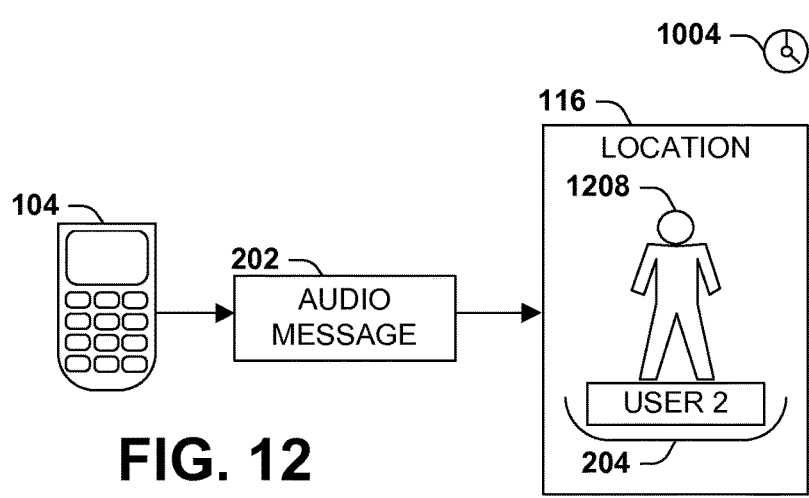

FIG. 12 presents an illustration of an exemplary scenario 1200 involving a second variation of this fourth aspect, wherein a server 1202 facilitates the subscription of users 102 to a source 108. In this exemplary scenario 1200, at a first time 124, upon receiving a request 1204 from a user 102 to subscribe to the audio messages 202 of the source 108, the server 1202 may store the user 102 in a subscription record 1206 as a subscriber 1208 of the source 108. Conversely, upon receiving from a subscriber 1208 a request to unsubscribe from the audio messages 202 of the source 108, the server 1202 may remove the user 102 as a subscriber 1208 of the source 108 from the subscription record 1206. At a second time 126, the source 108 may send to the server 1202 a request 114 to present an audio message 202 involving a location 116 to the set of subscribers 1208 of the source 1208. The server 1202 may send the request 114 to the mobile device 104 of each subscriber 1208, and each mobile device 104 may store 118 the request 114. At a third time 1004, when the mobile device 104 of a subscriber 1208 detects the presence 204 of the subscriber 1208 at a location 116 specified in a request 114, the mobile device 104 may present the audio message 202 to the subscriber 1208. In this manner, the server 1202 may facilitate the subscription of users 102 with sources 108 for the delivery of audio messages 202. These and other architectures may include a server that variously participates in the presentation of audio messages 202 to users 102 in accordance with the techniques presented herein.

E. Computing Environment

Figure 13:
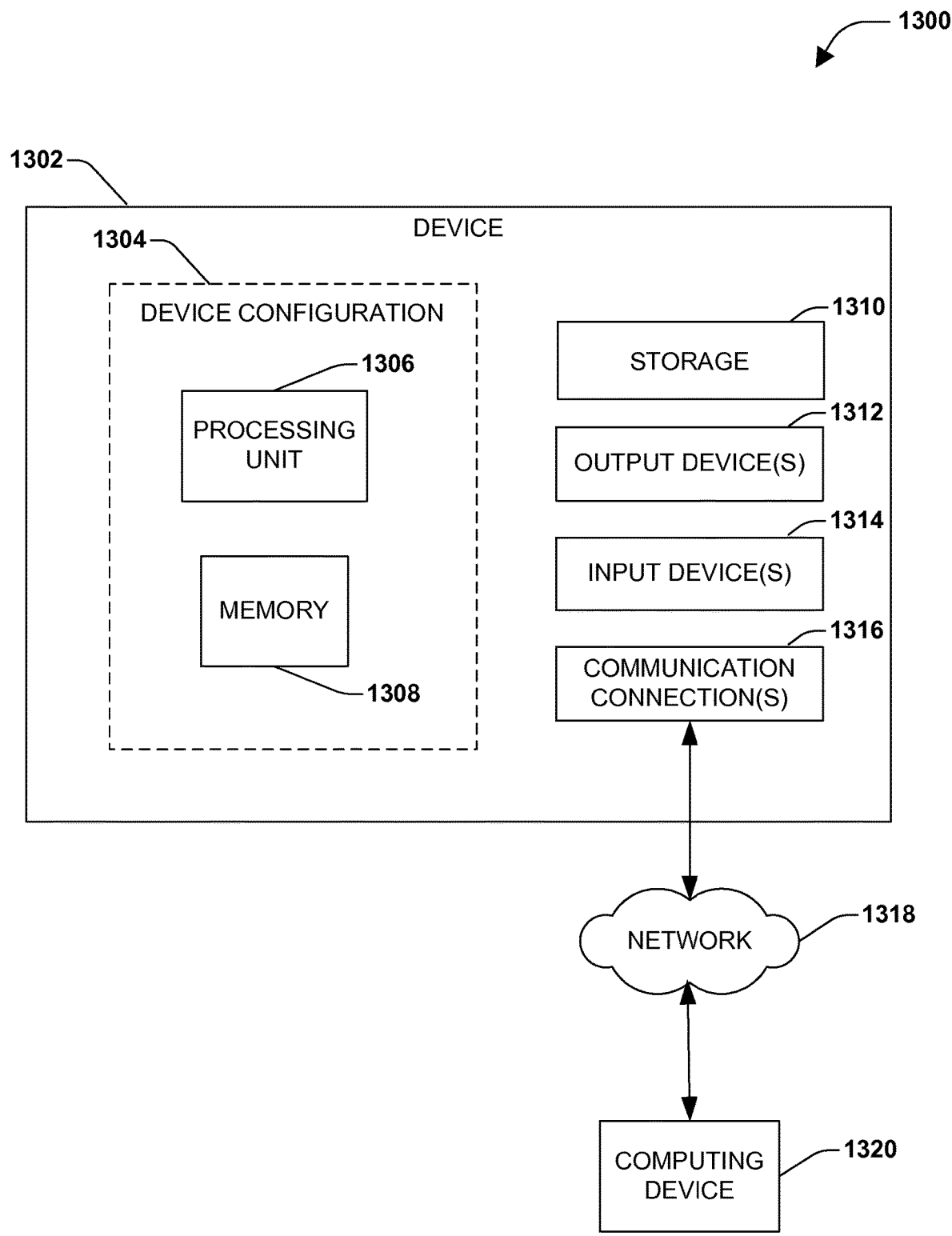
FIG. 13 is an illustration of an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1300 comprising a computing device 1302 configured to implement one or more embodiments provided herein. In one configuration, computing device 1302 includes at least one processing unit 1306 and memory 1308. Depending on the exact configuration and type of computing device, memory 1308 may be volatile (such as RAM, for example), non-volatile (such as ROM, flash memory, etc., for example) or some combination of the two. This configuration is illustrated in FIG. 13 by dashed line 1304.

In other embodiments, device 1302 may include additional features and/or functionality. For example, device 1302 may also include additional storage (e.g., removable and/or non-removable) including, but not limited to, magnetic storage, optical storage, and the like. Such additional storage is illustrated in FIG. 13 by storage 1310. In one embodiment, computer readable instructions to implement one or more embodiments provided herein may be in storage 1310. Storage 1310 may also store other computer readable instructions to implement an operating system, an application program, and the like. Computer readable instructions may be loaded in memory 1308 for execution by processing unit 1306, for example.

The term "computer readable media" as used herein includes computer-readable storage devices. Such computer-readable storage devices may be volatile and/or non-volatile, removable and/or non-removable, and may involve various types of physical devices storing computer readable instructions or other data. Memory 1308 and storage 1310 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1302 may also include communication connection(s) 1316 that allows device 1302 to communicate with other devices. Communication connection(s) 1316 may include, but is not limited to, a modem, a Network Interface Card (NIC), an integrated network interface, a radio frequency transmitter/receiver, an infrared port, a USB connection, or other interfaces for connecting computing device 1302 to other computing devices. Communication connection(s) 1316 may include a wired connection or a wireless connection. Communication connection(s) 1316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1302 may include input device(s) 1314 such as keyboard, mouse, pen, voice input device, touch input device, infrared cameras, video input devices, and/or any other input device. Output device(s) 1312 such as one or more displays, speakers, printers, and/or any other output device may also be included in device 1302. Input device(s) 1314 and output device(s) 1312 may be connected to device 1302 via a wired connection, wireless connection, or any combination thereof. In one embodiment, an input device or an output device from another computing device may be used as input device(s) 1314 or output device(s) 1312 for computing device 1302.

Components of computing device 1302 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1302 may be interconnected by a network. For example, memory 1308 may be comprised of multiple physical memory units located in different physical locations interconnected by a network.

Those skilled in the art will realize that storage devices utilized to store computer readable instructions may be distributed across a network. For example, a computing device 1320 accessible via network 1318 may store computer readable instructions to implement one or more embodiments provided herein. Computing device 1302 may access computing device 1320 and download a part or all of the computer readable instructions for execution. Alternatively, computing device 1302 may download pieces of the computer readable instructions, as needed, or some instructions may be executed at computing device 1302 and some at computing device 1320.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting an audio message to a user of a mobile device having a processor, the method comprising:
   executing on the processor instructions that cause the mobile device to:
     upon receiving from a source person other than the user a request to present the audio message to the user during a presence of the user at a location, the audio message including words spoken by the source person in a voice of the source person, store the request, wherein the request includes the audio message and specifies a condition in addition to the presence of the user at the location, wherein the condition in addition to the presence of the user at the location is not associated with the location; and
     upon detecting the presence of the user at the location and determining that the condition is satisfied, present the audio message to the user.

2. The method of claim 1, wherein:
the request specifies the location as a location type; and
detecting the presence of the user at the location further comprises detecting the presence of the user at the location of the location type.

3. The method of claim 1, wherein the condition comprises a time range of the presence of the user at the location.

4. The method of claim 1, wherein the condition comprises an event having a time range.

5. The method of claim 1, wherein executing the instructions further causes the mobile device to, upon presenting the audio message to the user, notify a device used by the source person that the audio message has been presented to the user.

6. The method of claim 1, further comprising:
receiving from the user a response to the audio message; and
sending the response to the source person.

7. The method of claim 1, wherein satisfying the condition in addition to the presence of the user at the location does not require the user to interact with the mobile device.

8. A method of presenting an audio message to a user of a mobile device having a processor, the method comprising:
   executing on the processor instructions that cause the mobile device to:
     upon receiving from a source person other than the user a request to present the audio message to the user during a presence of the user at a location, the audio message including words spoken by the source person in a voice of the source person, store the request, wherein the request includes the audio message and specifies a condition in addition to the presence of the user at the location; and
     upon detecting the presence of the user at the location and determining that the condition is satisfied:
       notifying a device used by the source person of the presence of the user at the location; and
       upon receiving the audio message from the device used by the source person, presenting the audio message to the user, the audio message having been created by the source person in response to the notification.

9. A mobile device that presents audio messages to a user, comprising:
   a memory;
   a speaker positionable near an ear of the user;
   an audio message request receiver that, upon receiving a request to present a requested audio message to the user during a presence of the user at a location, the request specifying a text message, stores the request in the memory;
   a location monitor that compares a current location of the user with the location of the request; and
   an audio message presenter that, upon the location monitor detecting the presence of the user at the location, presents to the user an audio message obtained by translating the text message into a speech message, wherein the audio message presenter presents the audio message to the user by:
     determining whether the user is interacting with at least one individual at the location; and
     upon determining that the user is not interacting with at least one individual at the location, presenting the audio message to the user.

10. The mobile device of claim 9, wherein:
the memory further stores a whitelist comprising one or more authorized sources; and
the audio message request receiver stores the request only upon verifying that the request was received from the one or more authorized sources according to the whitelist.

11. A mobile device that presents audio messages to a user, comprising:
   a memory;
   a speaker positionable near an ear of the user;
   an audio message request receiver that, upon receiving a request to present a requested audio message to the user during a presence of the user at a location, the request specifying a text message, stores the request in the memory;

a location monitor that compares a current location of the user with the location of the request; and an audio message presenter that, upon the location monitor detecting the presence of the user at the location, presents to the user an audio message obtained by translating the text message into a speech message, wherein the audio message request receiver receives the request from a source, the mobile device further comprising:

a response transmitter that, upon receiving from the user a response to the audio message, sends the response to the source, wherein:

after the audio message presenter presents the audio message to the user, the response transmitter presents to the user an offer to accept the response to the audio message; and the response transmitter, upon detecting an acceptance of the offer, receives the response to the audio message from the user.

12. The mobile device of claim 11, wherein:

the offer comprises at least one response option; and the response transmitter, upon receiving from the user a selection of a selected response option, sends to the source the response according to the selected response option.

13. The mobile device of claim 12, wherein:

the at least one response option is associated with an option gesture; and the mobile device comprises a gesture detector that, upon detecting a selected option gesture performed by the user, informs the response transmitter of the selection response option that is associated with the selected option gesture.

14. A method of configuring a server having a processor to deliver audio messages to a user, the method comprising:

executing on the processor instructions that cause the server to:

upon receiving from the user a subscription request to subscribe to audio messages of a source, store the user as a subscriber of the source;

register a mobile device associated with the user that is capable of presenting audio messages to the user;

upon receiving a request from a source separate from the user to present to the user an audio message associated with a location, monitor a current location of the mobile device of the user and send the audio message and the request to the mobile device of the subscriber of the source upon detecting that the current location of the mobile device matches the location specified in the request;

upon receiving from the user, after presentation of the audio message, a response to the audio message, send the response to the source; and upon receiving from the subscriber an unsubscribe request to unsubscribe to the audio messages of the source, remove the user as the subscriber of the source.

15. The method of claim 14, wherein:

the request specifies at least two users respectively having a user mobile device; and sending the audio message further comprises: sending the audio message to the respective user mobile device of the at least two users.

* * * * *